(12) United States Patent
Dishon et al.

(10) Patent No.: US 10,270,482 B2
(45) Date of Patent: Apr. 23, 2019

(54) AUTOMATED AVIONICS TESTING

(71) Applicant: Raytheon BBN Technologies Corp., Cambridge, MA (US)

(72) Inventors: John Dishon, San Diego, CA (US); Joshua N. Edmison, Ellicott City, MD (US); John-Francis Mergen, Baltimore, MD (US); Zachary Leuschner, Annapolis, MD (US); Kerry Wood, Elkridge, MD (US); Laurie Waisel, Columbia, MD (US); Tyler Shake, Baltimore, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 73 days.

(21) Appl. No.: 15/375,834

(22) Filed: Dec. 12, 2016

(65) Prior Publication Data

US 2017/0288789 A1    Oct. 5, 2017

Related U.S. Application Data

(63) Continuation-in-part of application No. 15/259,760, filed on Sep. 8, 2016.

(60) Provisional application No. 62/316,913, filed on Apr. 1, 2016.

(51) Int. Cl.
*H04B 1/04* (2006.01)
*H04B 1/16* (2006.01)

(52) U.S. Cl.
CPC ............... *H04B 1/16* (2013.01); *H04B 1/04* (2013.01)

(58) Field of Classification Search
CPC ............................................ H04B 1/16
USPC ........................................... 340/10.1
See application file for complete search history.

(56) References Cited

U.S. PATENT DOCUMENTS

| | | | |
|---|---|---|---|
| 5,491,631 A * | 2/1996 | Shirane | F02D 41/22 123/479 |
| 7,941,248 B1 * | 5/2011 | Tsamis | G08G 5/0013 701/3 |
| 9,740,975 B2 | 8/2017 | Gibson et al. | |
| 10,121,294 B1 | 11/2018 | Dishon et al. | |
| 2003/0158954 A1 * | 8/2003 | Williams | H04L 29/06 709/230 |
| 2005/0128074 A1 | 6/2005 | Culpepper et al. | |

(Continued)

OTHER PUBLICATIONS

Richard Linhart et al., Measuring RF Circuits Response Using Software Defined Radio System, Jan. 19, 2015, IEEE, Print ISBN: 978-8-0261-0276-2.*

(Continued)

*Primary Examiner* — Carlos Garcia
(74) *Attorney, Agent, or Firm* — Schwegman Lundberg & Woessner, P.A.

(57) ABSTRACT

An SDR system and method that intentionally illuminates aircraft systems with RF energy having specific characteristics (e.g., frequency, power, waveform, directionality, duration, etc.) are provided. The aircraft systems act as non-linear mixers and emit non-linear RF energy. A receiver receives the RF energy response and generates an RF energy representation that is correlated to a database of baseline responses. A correlation response between the received RF energy representation and any one of the baseline responses from the database provides an indication of the aircraft system status.

16 Claims, 6 Drawing Sheets

(56) References Cited

U.S. PATENT DOCUMENTS

| | | | |
|---|---|---|---|
| 2010/0056207 | A1 | 3/2010 | Yang |
| 2010/0097187 | A1 | 4/2010 | Hill |
| 2010/0112954 | A1 | 5/2010 | Son |
| 2011/0061605 | A1 | 3/2011 | Hardi et al. |
| 2013/0056532 | A1* | 3/2013 | Hasegawa ............ G07G 1/0063 235/375 |
| 2014/0214263 | A1* | 7/2014 | Boucher ............... B64F 5/0045 701/31.8 |
| 2015/0102105 | A1 | 4/2015 | Perret et al. |
| 2015/0120578 | A1* | 4/2015 | Roddy ................... G06Q 10/00 |
| 2015/0186695 | A1 | 7/2015 | Hill |
| 2016/0013657 | A1 | 1/2016 | Jeong et al. |
| 2017/0288788 | A1 | 10/2017 | Dishon et al. |
| 2017/0289786 | A1 | 10/2017 | Dishon et al. |
| 2018/0150344 | A1* | 5/2018 | Kim ...................... G06F 11/079 |

OTHER PUBLICATIONS

Remya et al., GNU Radio Based BIST for SDR Performance Measurement, 2014, IEEE, 978-1-4799-5958-7114/$31.00 (Year: 2014).*

Mashkov et al., Experimental Validation of Multipoint Joint Processing of Range Measurements via Software-Defined Radio Testbed, Jan. 31-Feb. 3, 2016, ICACT2016, ISBN 978-89-968650-6-3, pp. 268-273 (Year: 2016).*

Kimionis et al., Design and Implementation of RFID Systems with Software Defined Radio, 2011, IEEE, 6th European Conference on Antennas and Propagation (EUCAP), 978-1-4577-0919-7/12/$26.00, pp. 3464-3468 (Year: 2011).*

Yeste-Ojeda et al., Software Defined Radio Approach to Distance Measuring Equipment, 2014, IEEE, 978-1-4799-3320-4/14/$31.00, pp. 680-685 (Year: 2014).*

Sbir Investments in Software Defined Radio Technology, 2012, NASA (Year: 2012).*

José Raú 1 Machado-Fernández, Software Defined Radio: Basic Principles and Applications, Sep. 29, 2014, Revista Facultad de Ingeniería, vol. 24. No. 38. pp. 79-96, ISSN 0121-1129, eISSN 2357-5328 (Year: 2015).*

Joseph M. Jacob, The next advancements in Software-Defined Radio, Summer 2006, Reprinted from Military Embedded Systems (Year: 2006).*

Huang et al., A Hands-on Project for Avionics Systems Course in Aviation Engineering Technology Program, 2018, American Society for Engineering Education, Paper ID #21075 (Year: 2018).*

Charlotte Adams, SDR Takes Flight, Feb. 1, 2013, Aviation Today, https://www.aviationtoday.com/2013/02/01/sdr-takes-flight/ (Year: 2013).*

"U.S. Appl. No. 15/676,518 Response filed Apr. 30, 2018 to Non Final Office Action dated Dec. 28, 2017", 10 pgs.

"U.S. Appl. No. 15/676,518, Non Final Office Action dated Dec. 28, 2017", 12 pgs.

"GNU Radio Website", WaybackMachine: www.gnuradio.org, (Nov. 2015), 4 pgs.

"NSA TEMPEST Documents", [Online]. Retrieved from the Internet: <URL: https://cryptome.org/nsa-tempest.htm>, (Accessed Oct. 30, 2015), 2 pgs.

"Ramsey RF Shielded Test and Forensics Enclosures", Ramseytest.com—Nov. 2015, (Oct. 26, 2015), 2 pgs.

Agrawal, Dakshi, et al., "Multi-channel Attacks", Cryptographic Hardware and Embedded Systems—CHES 2003, vol. 2779, (2003), 2-16.

Agrawal, Dakshi, et al., "The EM Side-Channel(s)", Cryptographic Hardware and Embedded Systems—CHES 2002, vol. 2523, (2002), 29-45.

Agrawal, Dakshi, et al., "The EM Side-Channel(s): Attacks and Assessment Methodologies", Proceedings of the 4th International Workshop on Cryptographic Hardware and Embedded Systems, (2002), 1-42.

Batina, Lejla, et al., "Mutual Information Analysis: A Comprehensive Study", J. Cryptol., vol. 24, No. 2, (Apr. 2011), 269-291.

Bayrak, Ali, et al., "First Step Towards Automatic Application of Power Analysis Countermeasures", Proceedings of the 48th Design Automation Conference, (2011), 230-235.

Callan, Robert, et al., "A Practical Methodology for Measuring the Side-Channel Signal Available to the Attacker for Instruction-Level Events", Proceedings of the 47th Annual IEEE/ACM International Symposium on Microarchitecture (MICRO), (Dec. 2014), 242-254.

Callan, Robert, et al., "Comparison of Electromagnetic Side-Channel Energy Available to the Attacker from Different Computer Systems", IEEE International Symposium on Electromagnetic Compatibility (EMC),, (2015), 219-223.

Callan, Robert, et al., "FASE: Finding Amplitude-modulated Side-channel Emanations", Proceedings of the 42Nd Annual International Symposium on Computer Architecture, (2015), 592-603.

Clark, Shane, "The Security and Privacy Implications of Energy—Proportional Computing (Dissertations. Paper 782)", University of Massachusetts Amherst, (2013), 125 pgs.

Compston, James, et al., "A Fundamental Limit on Antenna Gain for Electrically Small Antennas", IEEE 2008 Sarnoff Symposium, (2008), 1-5.

Cui, Ang, "A Quantitative Analysis of the Insecurity of Embedded Network Devices: Results of a Wide-Area Scan", Proceedings of the 26th Annual Computer Security Applications Conference, (2010), 97-106.

Dasilva, Luiz, et al., "Requirements of an Open Platform for Cognitive Networks Experiments", 3rd IEEE Symposium on New Frontiers in Dynamic Spectrum Access Networks, (2008), 1-8.

Del Pozo, Santos, et al., "Blind Source Separation from Single Measurements Using Singular Spectrum Analysis", Cryptographic Hardware and Embedded Systems—CHES 2015, vol. 9293, (2015), 42-59.

Dysart, Paul, et al., "Regional Seismic Event classification at the NORESS array: Seismological Measurements and the Use of Trained Neural Networks", Bull. Seismol. Soc. Am., vol. 80, No. 6B, (Dec. 1990), 1910-1933.

Gandolfi, Karine, et al., "Electromagnetic Analysis: Concrete Results", Cryptographic Hardware and Embedded Systems—CHES 2001, vol. 2162, (2001), 251-261.

Gierlichs, Benedikt, et al., "Mutual Information Analysis: A Generic Side-Channel Distinguisher", Cryptographic Hardware and Embedded Systems—CHES 2008, vol. 5154, (2008), 426-442.

Hastie, T, et al., "", The Elements of Statistical Learning, Springer New York, (2009), 763 pgs.

Kim, Tae Hyun, et al., "Side channel analysis attacks using AM demodulation on commercial smart cards with SEED", The Journal of Systems and Software 85 (12), (Dec. 2012), 2899-2908.

Knight, John, et al., "Automated Classification of Active Acoustic Returns", Radix Systems, Inc., (Apr. 9, 1993), 16 pgs.

Kocher, Paul, et al., "Introduction to differential power analysis", J. Cryptogr, Eng., vol. 1, No. 1, (Apr. 2011), 5-27.

Kuhn, Markus, "Security Limits for Compromising Emanations", Cryptographic Hardware and Embedded Systems—CHES 2005, vol. 3659, (2005), 265-279.

Lakshminarayanan, Kaushik, et al., "RFDLimp: An Architecture for Monitoring the Wireless Ether", Proceedings of the 5th International Conference on Emerging Networking Experiments and Technologies, (2009), 253-264.

Li, Huiyun, et al., "Security Evaluation Against Electromagnetic Analysis at Design Time", Cryptographic Hardware and Embedded Systems—CHES 2005, vol. 3659, (2005), 280-292.

Meynard, Olivier, et al., "Enhancement of Simple Electro-Magnetic Attacks by Pre-characterization in Frequency Domain and Demodulation Techniques", Design, Automation Test in Europe Conference Exhibition, (2011), 1-6.

Montminy, D P, "Enhancing Electromagnetic Side-Channel Analysis in an Operational Environment (Dissertation)", Air Force Institute of Technology, (Sep. 2013), 247 pgs.

Muccioli, J P, et al., "Characterization of the RF Emissions from a family of microprocessors using a 1 GHz TEM cell", IEEE 1997 International Symposium on Electromagnetic Compatibility,, (1997), 203-207.

(56) References Cited

OTHER PUBLICATIONS

Muccioli, J P, et al., "Investigation of the theoretical basis for using a 1 GHz TEM cell to evaluate the radiated emissions from integrated circuits", IEEE 1996 International Symposium on Electromagnetic Compatibility, 1996. Symposium Record., (1996), 63-67.

Oliphant, T. E., "Python for Scientific Computing", Comput. Sci. Eng., vol. 9, No. 3, (May 2007), 10-20.

O'Shea, Timothy, et al., "Practical Signal Detection and Classification in GNU Radio", SDR Forum Technical Conference, (2007), 6 pgs.

Pedregosa, F, et al., "Scikit-learn: Machine Learning in Python", J Mach Learn Res, vol. 12, (Nov. 2011), 2825-2830.

Peeters, Eric, et al., "Power and electromagnetic analysis: Improved model, consequences and comparisons", Integr. VLSI J., vol. 40, No. 1, (Jan. 2007), 52-60.

Pulli, Jay, "Analysis of the Jan. 2015 Plainfield, CT Earthquake Sequence Using Waveform Correlation Techniques", Presented at the 87th Annual Meeting Eastern Section Seismological Society of America, University of Memphis., (Oct. 7, 2015), 18 pgs.

Pulli, Jay, "Instantaneous Power Calculations for the Patrick Alpha Acoustic Projector", Analysis Staff Technical Memorandum, (Sep. 5, 1989), 19 pgs.

Quisquater, J J, et al., "ElectroMagnetic Analysis (EMA): Measures and Counter-measures for Smart Cards", Smart Card Programming and Security, vol. 2140, (2001), 200-210.

Sarihari, Mohd Adib, et al., "Energy Detection Sensing based on GNU Radio and USRP: An Analysis Study", IEEE 9th Malaysia International Conference on Communications (MICC), (2009), 338-342.

Sharan, Ravi, et al., "The Comprehensive GNU Radio Archive Network", [Online]. Retrieved from the Internet: <URL: http://www.cgran.org/ >, (Nov. 2015), 5 pgs.

Van Der Walt, S, et al., "The NumPy Array: A Structure for Efficient Numerical Computation", Comput. Sci. Eng., vol. 13, No. 2, (Mar. 2011), 22-30.

Vuagnoux, Martin, et al., "An Improved Technique to Discover Compromising Electromagnetic Emanations", IEEE International Symposium on Electromagnetic Compatibility (EMC),, (2010), 121-126.

Vuagnoux, Martin, et al., "Compromising Electromagnetic Emanations of Wired and Wireless Keyboards", USENIX security symposium, (2009), 1-16.

Zajic, Alenka, et al., "Experimental Demonstration of Electromagnetic Information Leakage From Modern Processor-Memory Systems", IEEE Trans. Electromagn. Compat., vol. 56, No. 4, (Aug. 2014), 885-893.

Flintoff, Ian D., et al., "The Re-Emission Spectrum of Digital Hardware Subjected to EMI", IEEE Transactions on Electromagnetic Compatibility, vol. 45, No. 4,, (Nov. 2003), 11 pgs.

Vick, Ralf, et al., "The Dependence of the Immunity of Digital Equipment on the Hardware and Software Structure", (1997), 383-386.

"U.S. Appl. No. 15/676,518, Examiner Interview Summary dated Apr. 9, 2018", 3 pgs.

"U.S. Appl. No. 15/259,760, filed Oct. 15, 2018 to Non-Final Office Action dated Jun. 20, 2018", 9 pgs.

"U.S. Appl. No. 15/362,121, filed Oct. 15, 2018 to Non-Final Office Action dated Jun. 28, 2018", 10 pgs.

"U.S. Appl. No. 15/259,760, Non Final Office Action dated Jun. 20, 2018", 12 pgs.

"U.S. Appl. No. 15/362,121, Non Final Office Action dated Jun. 28, 2018", 15 pgs.

Shaw, et al., "Software Defined Radio as a solution to testing RF avionics", IEEE, Electronic ISBN: 978-1-4799-3005-0, (Sep. 15-18, 2014).

"U.S. Appl. No. 15/676,518, Notice of Allowance dated Jun. 12, 2018", 10 pgs.

* cited by examiner

AUTOMATED AVIONICS TESTING

RELATED APPLICATIONS

This is a continuation-in-part of and claims priority to U.S. application Ser. No. 15/259,760 entitled "Apparatus and Method for Remote Analysis of a Target Device", filed on Sep. 8, 2016, which claims priority to U.S. Provisional Patent Application Ser. No. 62/316,913 entitled "Forced Non-Linear Emissions", filed on Apr. 1, 2016, which are hereby incorporated by reference in their entirety.

TECHNICAL FIELD

Embodiments pertain to measurement and signal intelligence (MASINT). Some embodiments pertain to a system and methods for and the data obtained from illuminating aircraft systems with intentional radio frequency (RF) energy and observing resulting responses and behaviors.

BACKGROUND

Prior to an aircraft's flight, the pilot or pilots typically go through an aircraft checkout procedure to determine the aircraft's readiness for flight. This pre-flight check is performed on both the aircraft's physical systems (e.g., flight controls) as well as the aircraft's electrical and electronic systems (e.g., avionics, emergency systems). The pilots are able to check that the aircraft systems are able to turn on but cannot determine the internal operating condition of the systems. Additionally, the avionics system firmware version may not always be checked prior to flight.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
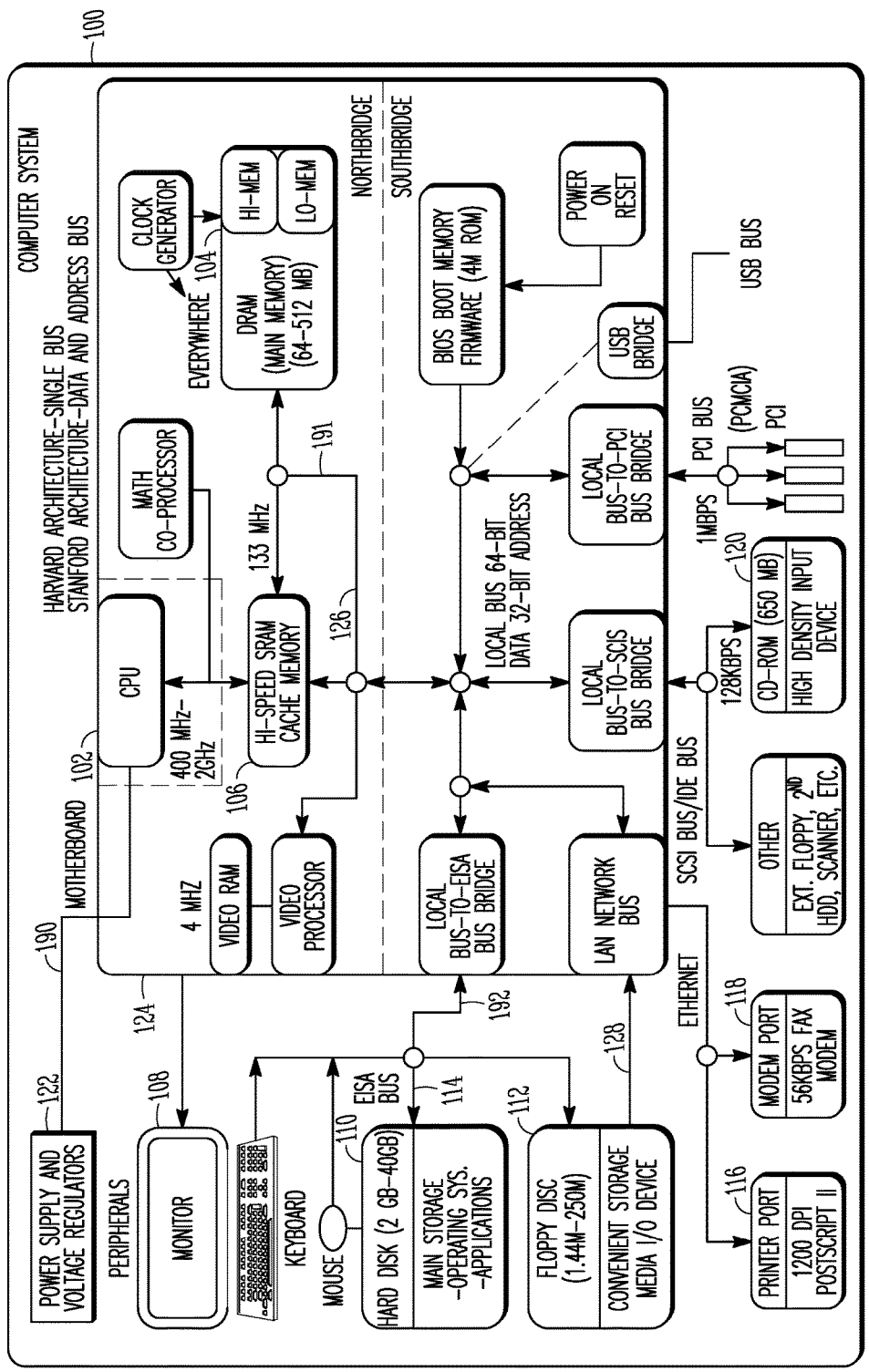
FIG. 1 shows a block diagram of an example target device, in accordance with various embodiments.

The inventors have recognized, among other things, that particular improvements of the system and methods used for analyzing aircraft systems are possible and would enable specific distinct advantages.

In an example, a software defined radio (SDR) system configured to remotely analyze a target device (e.g., aircraft systems) may include transmitter circuitry configured to illuminate the target device with electromagnetic energy that mixes with operational electromagnetic signals in the aircraft systems to produce forced non-linear emissions that radiate from the aircraft systems, and receiver circuitry configured to receive the forced non-linear emissions from the aircraft systems for subsequent analysis and evaluation.

In an example, a method of remotely analyzing a target device may include illuminating a target device using transmitter circuitry that outputs configured electromagnetic energy that mixes with operational electromagnetic signals in the target device to produce forced non-linear emissions that radiate from the target device, and receiving the forced non-linear emissions using receiver circuitry for subsequent analysis and evaluation.

In an example, a non-transitory computer-readable storage medium that stores instructions for execution by processing circuitry of an SDR, to configure the SDR to illuminate a target device using transmitter circuitry that outputs configured electromagnetic energy that mixes with operational electromagnetic signals in the target device to produce forced non-linear emissions that radiate from the target device, and to receive the forced non-linear emissions using receiver circuitry for subsequent analysis and evaluation.

The inventive examples described below may address the shortcomings of previous efforts and enable advantageous remote sensing and characterization of a target device or system. This disclosure describes systems and methods for characterizing, observing, and measuring target devices from a standoff distance limited only by the ability to place RF energy on the target devices and properties of the target devices. The solution provided requires no a priori knowledge of devices, may be tailored to avoid impacting target device operation, does not require physical access to the target device, and does not require software/hardware on the target device itself. The disclosed examples leverage the analog properties of a target device, present in both analog and digital elements, to extract useful information about the target device.

The examples described make novel use of involuntary analog emissions from all classes of target devices to enhance cyber defense. This approach may exploit the signal content of forced electromagnetic (EM) emissions from illuminated target devices. The non-linear properties of the forced emissions enable circumvention of shielding and greatly decrease the likelihood of a target device, including both its software and hardware, manipulating the measurements. The solution provided thus enables assessment of the operations of many heterogeneous target devices remotely and efficiently.

The exemplary system may comprise illumination devices or transmitter circuits for producing electromagnetic energy, and receiver devices or circuits for receiving forced emissions. The methods may extract the key re-emission signals from noise, and analyze the resulting signal data for behaviors. The data obtained may enable defense contractors to assess reemission characteristics of military systems, allow civilian consumers to monitor their home devices, and enable businesses to monitor their enterprises.

FIG. 1 shows a block diagram of an example target device 100 in accordance with some embodiments. In this example, the target device is a personal computer (pc) system, though many other types of electronic circuits may also be investigated via the forced emission approach, including cell phones, pagers, and other consumer electronic devices, as well as avionics systems. The disclosure is not limited in this respect, however.

The target device 100 may comprise a variety of components that each may operate at a given clock frequency or data transfer rate. For example, a central processing unit (CPU) 102 may be the highest speed component in the target device, with a clock speeds often between 400 MHz to over 2 GHz. Memory systems 104 and 106 may transfer data to and from the CPU 102 at a somewhat lower speed that may depend on the bandwidth of printed circuit board traces, e.g., 133 MHz. The target device 100 may generate video data for display on a monitor 108, with data rates of perhaps four MHz.

Each of these devices may transfer data over pathways that use known frequency ranges. Primary data storage devices such as a hard disk drive 110 or a floppy disc unit 112 may communicate with the CPU 102 via an interface bus 114, such as the well-known EISA personal computer bus. Peripheral devices that provide data transfer are also familiar to one of ordinary skill in the art of computer systems. Printers 116, modems 118, scanners, mice, keyboards, CD-ROM drives 120, and PCMCIA cards for example often use standardized interfaces that may operate at known data exchange rates or at least identifiable ranges thereof.

As shown in FIG. 1 in bold, electromagnetic energy may be injected into the target device 100 through various channels. For example, the connection between a target device's power supply 122 and a main motherboard 124 may receive intentionally applied illumination. The result may be that the normally regulated supply voltages provided to power the various components of the target device 100 may be altered. The incoming illumination or electromagnetic radiation may be distributed throughout the target device 100 via the power supply network.

The externally generated illumination may also be injected via primary interface bus 126 and peripheral interface buses 114 and 128, as also shown in bold. The applied electromagnetic energy may mix with signals transferring to and from the CPU 102, producing forced non-linear emissions that radiate away. In one example, the forced non-linear emissions may radiate from one or more antennas of the target device, although the disclosure is not limited in this respect. The forced emissions may be analyzed to determine the signals that were transferring to and from the CPU 102.

Figure 2:
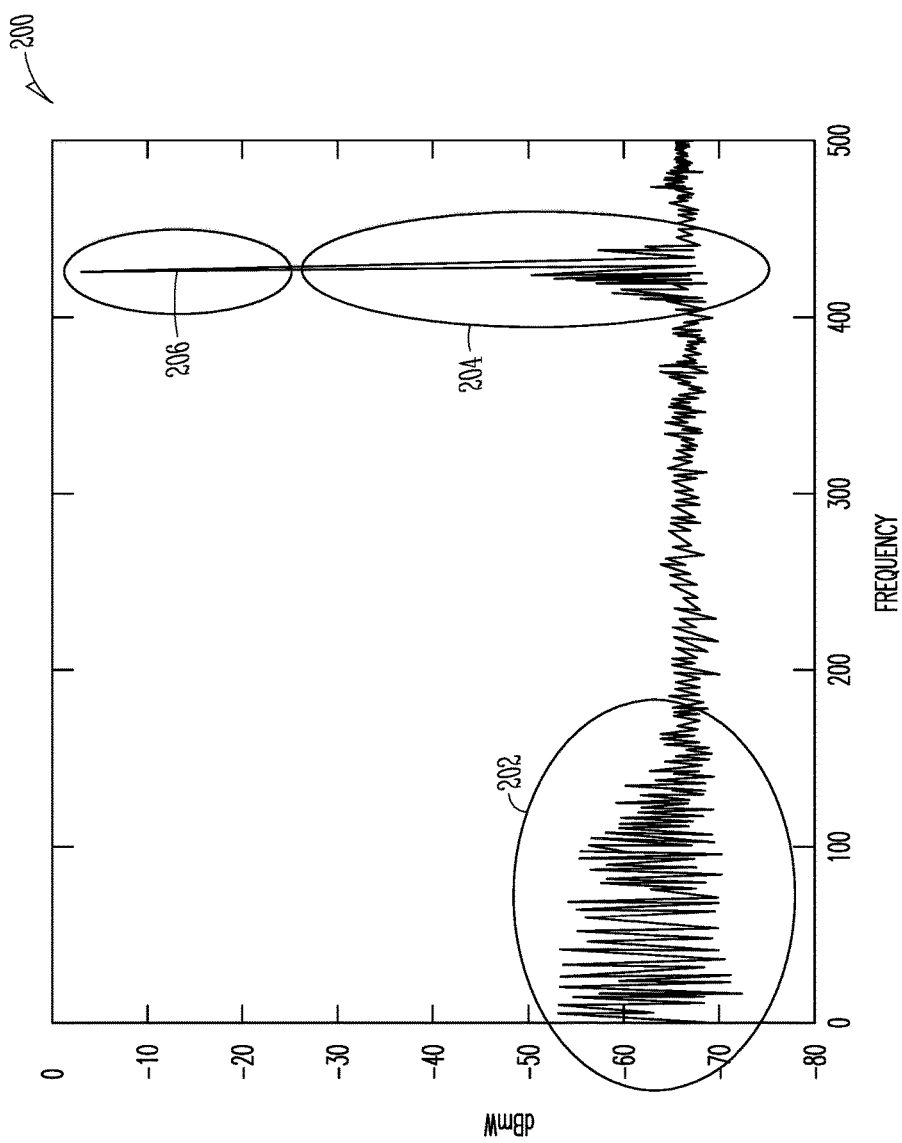
FIG. 2 shows a plot of an example spectrum of emitted electromagnetic power versus frequency emitted by a target device, in accordance with various embodiments.

FIG. 2 shows plot of an example spectrum of emitted electromagnetic power versus frequency 200 emitted by a target device, in accordance with various embodiments. At the lower end of the frequency range, a variety of unintended emissions 202 are shown. Digital devices of all types emit unintentional RF. When illuminated with intentional RF energy, electronic devices may emit forced non-linear emissions (FNLE), also described as the re-emission spectrum 204. The non-linear emissions are the result of superheterodyne-like mixing of normal operating signals with the externally applied illumination. The large peak shown represents the carrier wave 206 of the intentional illumination signal. On either side of the large peak 206, the re-emission spectrum of the forced non-linear emissions 204 is shown. In general, the re-emission spectrum 204 manifests as sidebands around a carrier frequency, and is largely dependent upon the physical characteristics of the target device 100 (e.g., its hardware, software, and operating state). The re-emission spectrum 204 may contain considerable information about the interaction of the illuminating RF energy and the target device 100.

The examples provided may illuminate a target device or system under test (SUT) 100 with RF waveforms swept across a broad range of frequencies. Illuminating a SUT generates mixed signal products. e.g., signals resulting from the combination of the illumination signal and existing on-board SUT signals. This mixing provides unique signal characterization opportunities that may be exploited by several exemplary and non-limiting embodiments. These opportunities may include:

Increased signal detection range: Illumination may provide a carrier signal that mixes with signals present in the target system. This interaction may produce a mixed signal, an FNLE 204, with improved signal strength that can be detected at a greater range. Experimental tests suggest that a gain of 50 dB may be expected over emissions occurring without illumination. The corresponding improvement in signal-to-noise ratio enables remote sensing improvement goals in various environments. Further, in one example, the forced non-linear emissions 204 may radiate from the target system 100 via an antenna of the target system 100, further increasing the detection range for a given illumination power. The frequency of the illumination energy may be configured to avoid interference with signals that radiate from the target system antenna during normal operation of the target system 100. However, the scope of this disclosure is not limited in this respect.

Increased signal fidelity: Illumination mixing produces a host of new FNLE 204 at new frequencies. These emissions are probably unanticipated by the target system's designers and are thus unlikely to be RF shielded or suppressed. The effects of illumination may therefore provide a broader, more complex set of signals for analysis. This wider range of signal information about the target system 100 may aid in the characterization of the target system 100.

Increased information content on the SUT's operational state: The cross modulation and intermodulation products within the FNLE 204 generated may have their origins in many parts of the SUT 100. Examples include but are not limited to mixed signals due to clock transitions. FM signals produced by mixing with data on memory and address busses, induced non-linear signals with complex harmonic structures caused by changing the operating regime of semiconductors, and mixing products generated by systems on a chip. All of these may produce signatures that when combined denote characteristics underlying the operation of the SUT 100, e.g., its presence or a count of multiple target devices present, and its "health" or conformance to desired operational behaviors. It may also be possible to discern the presence of a number of particular instances of a component in the target device 100, enabling inventory control and situational awareness through a survey of detected devices. The signal data generated by for example software defined radio (SDR) based test pods may be analyzed using non-linear classification and data mining methods to exploit the complex nature of the signal features (e.g., phase and harmonic structures) to characterize SUT 100 operations. The additional signal content available from FNLE 204 may enable desired classification accuracy.

General operational applicability: The excitation mechanism and receivers in one exemplary implementation are an SDR system. SDRs may automatically illuminate SUTs at multiple frequencies and waveforms to characterize and analyze the operation of the SUT. That is, multiple illumination signals may be applied simultaneously to induce multiple forced non-linear emissions 204. However, the disclosure is not limited in this respect.

The disclosed examples may form the basis of a new security/monitoring capability for protecting IoT (Internet of things) circuits or similar devices by monitoring their behavior at a physical level from a standoff distance. They may also form the basis of a counterfeit detection capability or erroneous operation capability for aircraft, ships, land vehicles, or other platforms. The examples provided may also enable new methodologies for low bandwidth communication.

Figure 3:
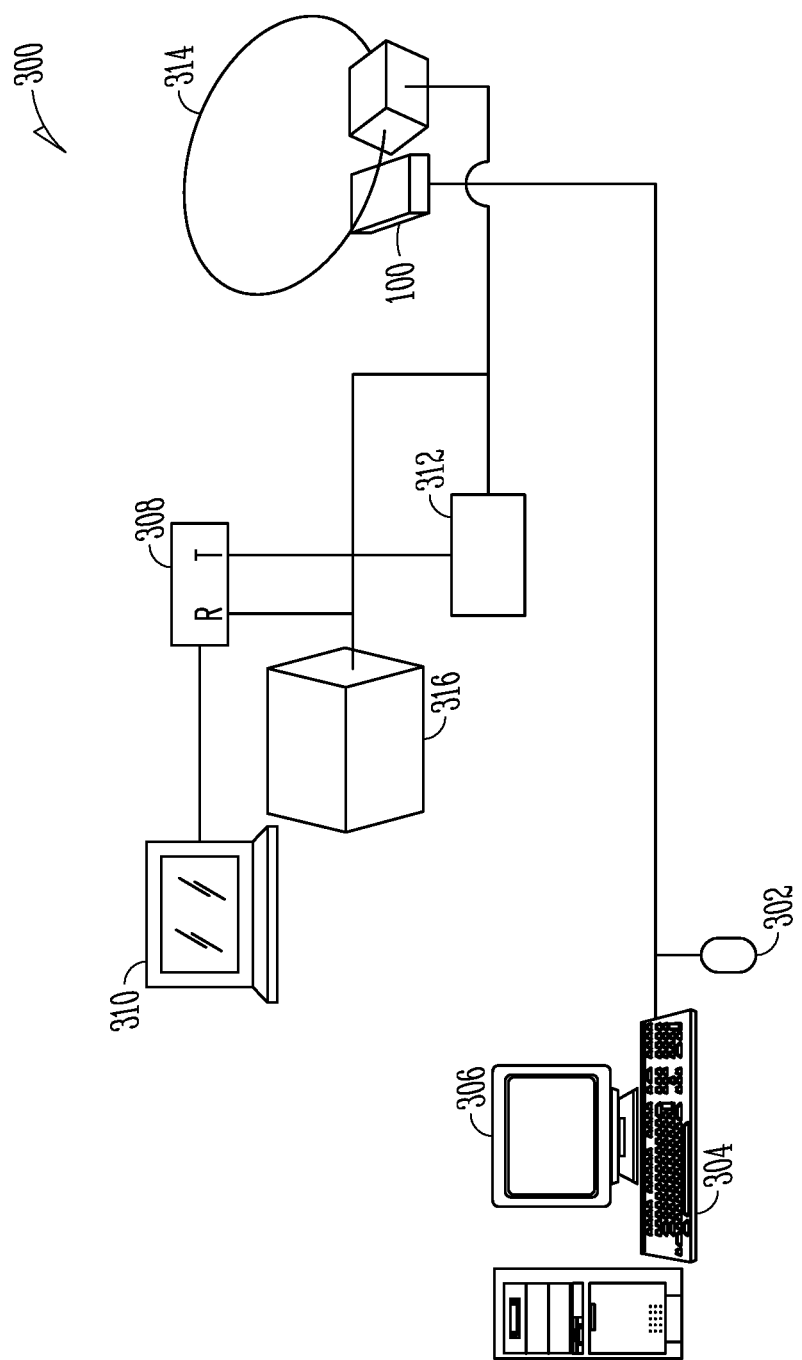
FIG. 3 shows a block diagram of an example forced non-linear emission apparatus, in accordance with various embodiments.

FIG. 3 shows a block diagram of an example forced non-linear emission system 300, in accordance with various embodiments. An initial implementation has demonstrated the concept has been reduced to practice. In this example, the target device is a Raspberry Pi® microcomputer, available from the Raspberry Pi Foundation. A mouse 302, keyboard 304, and monitor 306 are connected to the target device 100 to enable a user to control its operations.

A typical illumination apparatus may comprise one or more RF emitters or transmitter circuits positioned at some distance from the target devices 100. The distance from the target devices 100 may be fixed or variable, enabling operation on a moving platform based on air, sea, or land. Increased proximity to the target devices 100 may reduce a required illumination power. One or more RF receiver circuits may also be placed at a distance. Receivers may be placed farther away from the target devices 100 than the emitters.

In this example, the receiver circuit and transmitter circuit comprise a software-defined radio transceiver 308, which is capable of operation from 70 MHz to 6 GHz. The transceiver 308 may be controlled for example by a laptop computer 310 that executes a software-defined radio program with an AM demodulator. The output from the transceiver 308 may be fed into a frequency shifter 312 that may, for example, shift the transmitted signal upward in frequency by 125 MHz to produce an illumination signal. The illumination signal in this example drives a loop antenna 314, which may be driven directly as a transmitting antenna and also tuned over a receiving frequency range of 650 kHz to 4.8 MHz by loop antenna tuning capacitor 316 to serve as a receiving antenna, for simplicity. The loop antenna 314 is shown suspended over the target device 100 by several inches, but the disclosure is not limited in this respect.

Illumination by one or more RF illuminators (including possible simultaneous illumination) may occur across a range waveforms including but not limited to frequencies of 100 MHz to ten GHz for example. The illumination frequency may vary incrementally at a predetermined step rate, such as in ten kHz steps. In addition to the frequency, other waveform parameters such as continuous or pulsed illumination type, repetition rate, duration, and power may be selected. Illumination with each waveform may occur for approximately two seconds for example, but could occur for shorter or longer times depending on the target devices 100 and the geometric configuration of the RF illuminators/receivers. If a specific waveform appropriate for the target devices 100 is known, then those waveforms may be used instead of a sweep.

Approximately simultaneously with illumination, the receiving antennas may be receiving the forced emissions 204 comprising the carrier waveform, sidebands, and other frequencies resulting from penetration by the illumination waveform(s) into the target devices 100, non-linear mixing in the target devices 100, and re-emission from the target devices 100 to the receiver circuit. Depending on the type of target device 100 and the waveform properties, the re-emission may be enhanced by on-device antenna structures to enable reception of the re-emissions 204 from a greater distance than re-emissions from a target device without an antenna. The received re-emission signals 204 may be collected over both a range of frequencies and time. Time may range from sub-millisecond spans to days, for example.

The received signals may be analyzed to extract target device 100 information. Applicable analysis technique examples may include analysis of the re-emission spectrum 204, spectrum variation over time, and calculation of cross-modulation products and/or third-order intermodulation products. From these techniques, various properties of the target devices 100 may be assessed, such as state, activity, behavior, physical characteristics, or other observed phenomena. The return spectra may for example also be used to adaptively control the illumination based on the obtained target device 100 information. In an example, the illumination frequency may be changed for forced non-linear responses 204 to avoid interference with normal target device 100 emissions. However, the disclosure is not limited in this respect.

Figure 4:
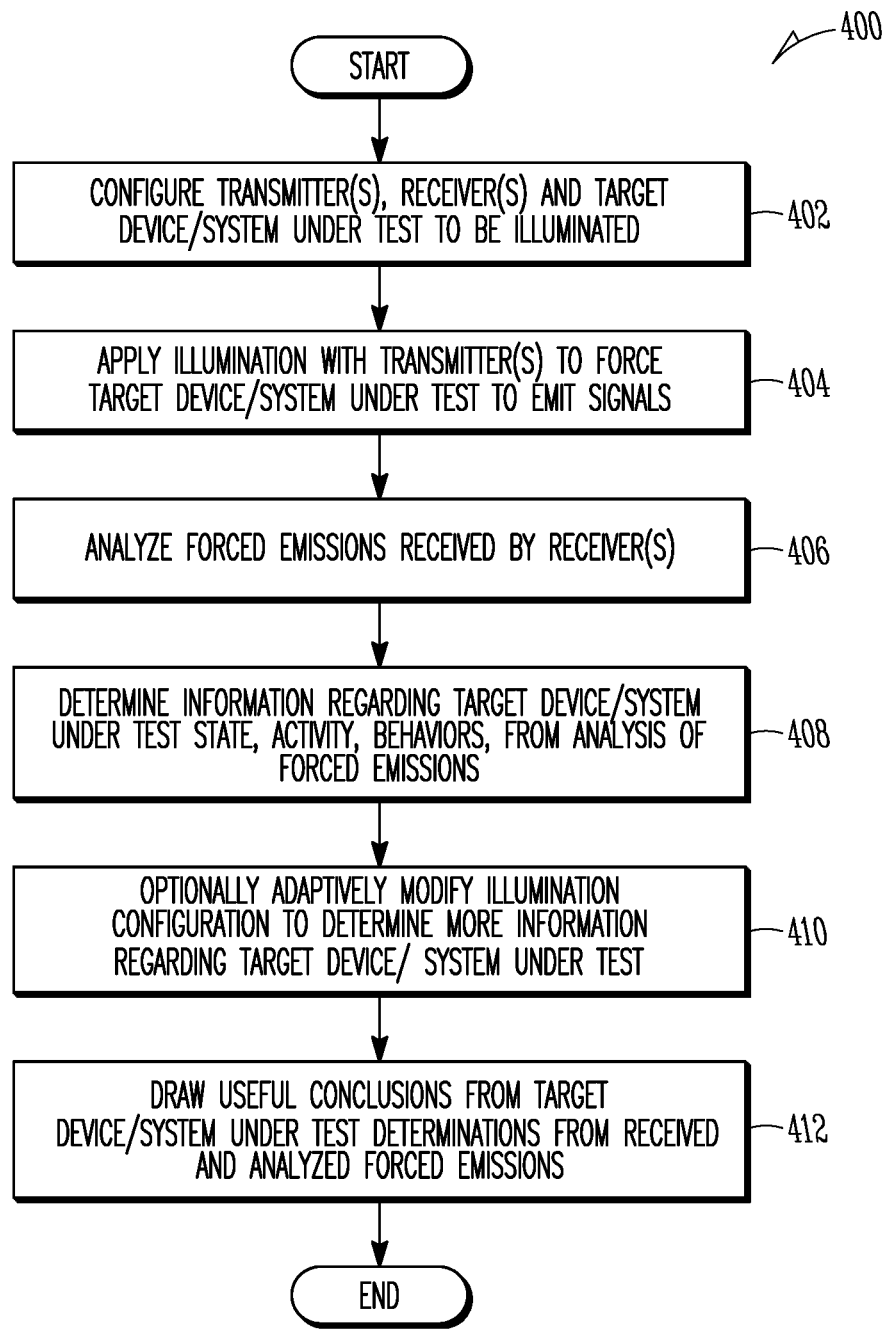
FIG. 4 shows a flowchart of an example of a forced non-linear emission method, in accordance with various embodiments.

FIG. 4 shows a flowchart of an example of a forced non-linear emission method, in accordance with various embodiments. At 402 the method may configure the transmitter circuits, receiver circuits, and the electromagnetic energy to be transmitted to the target device 100. For example, a user may define an output power, frequency range, sweep parameters, etc. to tailor the illumination to a given target device 100. At 404, the method may apply the illumination using the transmitter circuits to force the target device 100 to emit non-linear signals 204 resulting from the mixing of the illumination as previously described. At 406, the method may receive the forced non-linear emissions 204 with the receiver circuits and analyze these emissions using a variety of analytical techniques. At 408, the method may determine useful information regarding the target device 100 from the analysis of the forced non-linear emissions 204. The information may for example describe the state, behavior, and characteristics of the target device 100. At 410, the method may, optionally, adaptively modify the illumination configuration to determine more information regarding the target device 100. For example, output power, illumination type (continuous or pulsed), and frequency values or sweep ranges may be altered in response to the analysis of previously applied illumination. At 412, the method may draw useful conclusions regarding the target device 100 from the received and analyzed forced non-linear emissions 204. For example, it may be determined that the target device 100 is active and is processing data, or it may be determined that the target device 100 is currently inoperative.

In one example embodiment, the target device 100 is an aircraft system or systems. Thus, the SDR system may be used to determine the status of aircraft systems prior to flight or after a flight. The subsequently described embodiment may be combined with any previously described embodiment.

Figure 5:
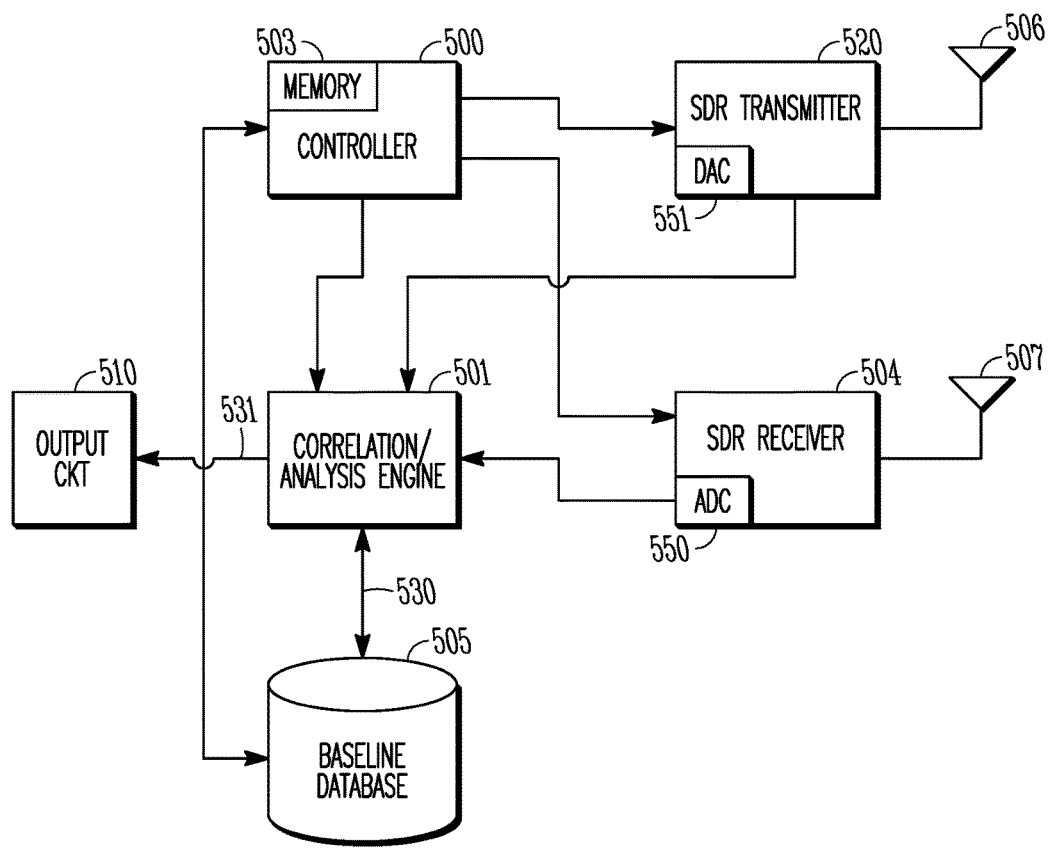
FIG. 5 shows a block diagram of a software defined radio (SDR) system, in accordance with various embodiments.

FIG. 5 shows a block diagram of an example of an SDR system, in accordance with various embodiments. The block diagram of the SDR system is for purposes of illustration only as one system that can implement automated aircraft systems testing.

The system includes a controller 500 for controlling operation of the system. The controller may be a central processing unit (CPU), microprocessor, reduced instruction set computer (RISC), or control circuitry comprising control logic. The controller 500 may include or be coupled to memory 503 to store operating instructions.

An input device 540 is coupled to the controller 500. The input device 540 may be a keyboard, keypad, or a touchscreen display for the user to enter data to the system. For example, the user may input a cockpit profile of the aircraft under test, as described subsequently.

The memory 503 may include at least one non-transitory computer-readable medium on which is stored one or more sets of data structures or instructions (e.g., software, firmware) embodying or utilized by any one or more of the techniques, methods, or functions described herein. The software, when executed by the controller 500, causes the hardware of the system to perform the specified operations of the methods described herein.

The memory 503 may include volatile memory and/or non-volatile memory. For example, the memory 503 may include one or more of random access memory (RAM), read only memory (ROM), erasable programmable read-only memory (EPROM) and electrically erasable programmable read-only memory (EEPROM), flash memory, or other memory technologies.

An SDR transmitter 520 is coupled to and controlled by the controller 500 and is configured to transmit signals as determined by the controller, such as the intentional RF energy as described previously. The transmitter 520 may include a modulator to modulate the signal in some way prior to transmission. The RF energy is radiated from an antenna 506 coupled to the transmitter 520. Power amplifiers in the transmitter 520 may adjust the transmit power of the intentional RF energy as determined by the controller 500. The SDR transmitter 520 may also include a digital-to-analog converter (DAC) 551 that converts signals from the controller 500 to analog signals for transmission.

An SDR receiver 504 is coupled to an antenna 507 to receive the signals radiated back from the aircraft systems. The receiver 504 may include a demodulator to demodulate any returned modulated signals. The SDR receiver 504 is also coupled to the controller 500 so that the controller 500 can control operation of the receiver 504 as necessary. The SDR receiver 504 may also include an analog-to-digital converter (ADC) 550 to convert the analog RF energy signal radiated from the aircraft systems into a digital representation of the RF energy.

A correlation and analysis circuit 501 (e.g., correlation/analysis engine) is coupled to the SDR receiver 504, the controller 500, and the SDR transmitter 520. The correlation/analysis engine 501 receives signals from the SDR receiver 504 for analysis and correlation with signals stored in a database 505. The correlation/analysis engine 501 is coupled to an output circuit 510 that outputs the results of the correlation/analysis operation. The output circuit 510 may be a display, a printer, a voice response system, or some other way of informing a technician or a pilot of the results of the analysis of the aircraft systems.

A baseline database 505 is coupled to the correlation/analysis engine 501 and the controller 500. The database 505 is a mass memory storage device (e.g., magnetic drive, optical drive, solid state drive (SSD), tape drive) that stores representations of received RF energy representations and what each signal represents. The baseline database 505 stores known good (e.g., baseline) RF energy representations of avionics as described subsequently.

Both the controller 500 and the correlation/analysis engine 501 may access the database to write cockpit profiles and their respective associated received RF energy representations as well as to read the cockpit profiles and their associated received RF energy representations. As used herein, a cockpit profile may be defined as a listing of avionics that are installed in a particular aircraft. Since each avionics system may generate different RF energy responses from the intentional RF energy, a plurality of different possible cockpit profiles may be stored and associated with a known good response (e.g., RF energy representation, baseline response).

The database of cockpit profiles and their respective associated received RF energy representations may be generated by exposure of each known good cockpit profile with the intentional RF energy and then recording the response. Each response is then stored with its respective profile in the database for future comparison of responses during actual testing. The database may further contain additional information associated with the cockpit profile that may affect the received RF energy representation. This information may include whether the empirical testing was performed with the avionics in a powered on or off state or the firmware/software version or versions for each avionics system installed in the cockpit that requires firmware/software to operate. For example, different operating software or firmware may control avionics elements at varying times which suggests dissimilar versions.

The connections 530 between the correlation/analysis engine 501 and the baseline database 505 may be a direct electrical connection or a wireless channel. The wireless channel may be Wi-Fi operating using one of the IEEE 802.11 standards. In another embodiment, the wireless channel is a cellular datalink (e.g., enhanced data rates for GSM evolution (EDGE), long term evolution (LTE)). For example, instead of the database 505 being located with the rest of the system, it may be located remotely with a server and connected to the Internet or some other network (e.g., local area network, wide area network). Locating the database 505 away from the system may enable easier and/or more reliable updates of the database that may then be accessed by a number of different aircraft systems testing system.

Similarly, the connection 531 of the correlation/analysis engine 501 to the output circuit 510 may be a direct electrical connection or a wireless channel. For example, instead of being located with the rest of the system, the output circuit 510 may be a display or printer at a maintenance facility on or near the airport. The system may thus directly inform the mechanics of a problem with a particular aircraft. The system may output both the aircraft identification as well as the associated test results.

The system of FIG. 5 may be a man-portable device that is carried into the cockpit by a technician or pilot. In another embodiment, the system may be used outside of the aircraft prior to departure. The system may also be permanently mounted in the aircraft and activated by the pilots as part of the pre-flight check.

Figure 6:
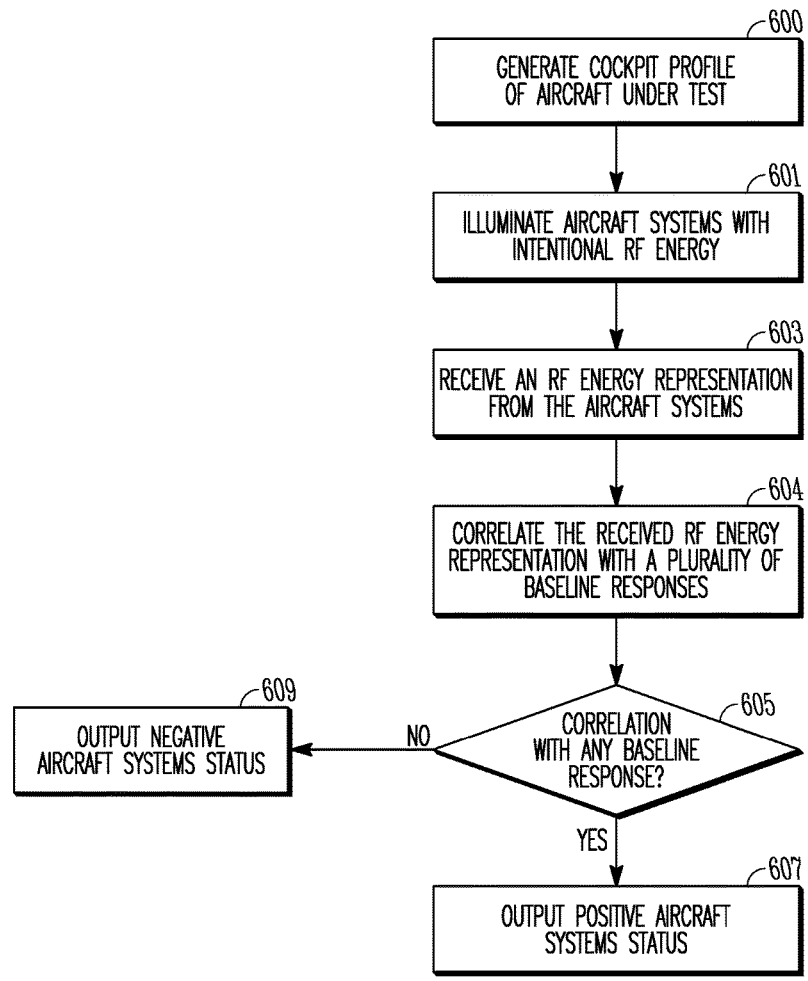
FIG. 6 shows a flowchart of a method for automated aircraft systems testing, in accordance with various embodiments.

FIG. 6 shows a flowchart of a method for automated aircraft systems testing, in accordance with the embodiment of FIG. 5. Reference is made to the system of FIG. 5 while discussing the execution of the method for automated aircraft systems testing and operation of the system of FIG. 5.

In block 600, a cockpit profile may be generated for the particular aircraft under test. The cockpit profile for the aircraft under test may be generated or input by the mechanic or pilot by inputting the installed avionics and their respective, associated firmware versions for each avionics into an application.

In block 601, the system illuminates the cockpit or other relevant portions of the aircraft having critical systems with intentional RF energy to force the non-linear emissions from the aircraft's critical systems. For example, the carrier illustrated in FIG. 2 may be transmitted from the antenna 506 of the SDR transmitter 520 as the intentional RF energy. The transmitter 520 may perform any amplification and/or modulation of the transmitted energy. The controller 500 may access the database 505 and determine that a particular frequency, range of frequencies, or multi-tone emissions are to be transmitted for a particular cockpit profile. The controller 500 may then control the transmitter 520 to transmit that particular intentional RF energy.

In block 603, the non-linear emissions from the aircrafts systems are received by the receiver antenna 507 and the SDR receiver 504 and converted to a received RF energy representation. The received RF energy representation (e.g., scan result) is correlated, by the correlation/analysis engine 501, with the known good representations of avionics systems (e.g., baseline responses) stored in the database 505 that are associated with the input cockpit profile. Since the transmitter 520 and controller 500 are coupled to the correlation/analysis engine 501, the engine 501 knows what RF energy was transmitted and what the cockpit profile of the aircraft under test is. Accessing the database 505, the correlation/analysis engine 501 can compare the received RF energy representation with the known good representation from memory.

In block 604, the baseline database is accessed and the received RF energy representation is correlated with the plurality of baseline responses stored in the database. In block 605, it is determined if the received RF energy representation correlates with any of the plurality of stored RF energy representations. If there is a match, then the aircraft under test has passed the test. In block 607, a positive results aircraft systems status is output by the correlation and analysis circuitry to the output circuits 510 to indicate that the test passed.

If the received RF energy representation does not match the stored RF energy representation, the aircraft under test has failed. In block 609, a negative results signal is output to the output circuits 510 to announce that the test failed. In an embodiment, if the database 505 includes different RF energy representations for each different failed avionics system, it would be possible for the correlation/analysis engine 501 to compare the received RF energy representation to each of the stored, failed representations to determine which avionics system has failed. Failures may include inoperative avionics or outdated firmware versions.

In one example, the systems and methods described above may enable a rapid validation that the avionics systems in an aircraft cockpit are operating in a known state. During an initialization phase, an illumination/receiving system (also generally termed an FNLE system in this description) may be positioned at a reproducible location in the cockpit when selected avionics systems are operating in a known state. This may, for example, be just after maintenance and verification of the known state via a direct viewing of the avionics system's control panel. In one example, the reproducible location may be the head rest of the pilot's seat. The FNLE system may illuminate the cockpit when the cockpit is closed, and receive the forced non-linear emissions as previously described. The FNLE system may create and record a "known good set" of results, and save this baseline of the SUT as a future reference point. The baseline may be recorded both for a given type of aircraft and for the specific airframe being tested.

The FNLE system may be placed back into the cockpit at the reproducible location when aircraft operational verification is desired, such as just prior to flight for example. The cockpit may be emptied and the FNLE system triggered to illuminate the environment and record the forced emissions over a period of perhaps one or two minutes. Note, the cockpit may be vacated to improve the reliability of readings and not for health and safety reasons as FNLE system may operate at low power in this scenario. The recorded results from the test set against which subsequent results may be correlated.

Next, the FNLE system or a separate verification system may perform a comparison of the test set and the known good set. The similarities and differences in the received emissions are evaluated to determine differences in the operations of the SUT. If these differences are below a threshold, the system under test is deemed to be operating properly. The FNLE system may provide the results of the comparison between the nominal operating characteristics of the system and the actual operating state.

The avionics systems maybe further verified, either automatically or manually, by repeating the exercise described above for a variety of operational states. For example, in one test the cockpit instrumentation may be illuminated and scanned when a global positioning system (GPS) is operating in an en-route or cruising mode, and then illuminated and scanned again when operating in an approach mode such as may be used during landing. The further verification methodology may exercise more of the software capabilities of the avionics system, and may provide more robust coverage of the various operating environments of particular systems, such as the GPS. The disclosure is not limited in this respect, however.

In an example, the FNLE system may provide a rapid assessment of the number and types of devices in a room. The FNLE system may first individually illuminate and scan a number of devices to form a catalog of characteristic results that may form a "reference set". Next, the FNLE system may be placed into a room and activated. The system may initially survey the room to gather observations of radio emissions prior to initializing its transmitter circuits to illuminate the room. The gathered observations may be recorded and form a "baseline set". The FNLE system may then illuminate and scan the room to form an "illumination set". The FNLE system may normalize the illumination set using the baseline set, so that the forced emissions 204 alone may be determined. The difference between the illumination set and the baseline set, due to the forced emissions 204, may form a "test set".

The FNLE system or a separate verification system may then compare the test set against the reference set to potentially recognize known target device 100 types. That is, if a match between the test set and the reference set occurs, that may indicate that a known target device 100 is present. The recognition process may be repeated until all of the forced non-linear emissions 204 have been matched with a target device 100 that is a member of the test set, or the test set has been exhausted. Remaining unidentified FNLEs may trigger an alert that at least one remaining unidentified device is present. The disclosure is not limited in this respect, however.

In an example, the forced non-linear emissions 204 may enable detection of counterfeit target devices 100. The forced emissions 204 may vary according to the type of target device 100 and its particular components, the software it is running, and even by the particular data it is internally exchanging. The FNLE system may therefore illuminate and scan a reference target device 100 that is well characterized as comprising particular subsystems or components, running particular software, and exchanging particular data, to produce a very particular reference set for comparison. Thus the very specific returned emissions corresponding to a precise set of operational circumstances and hardware may serve as a 'fingerprint' for a particular target device 100 or nearly identical duplicate. If an illuminated and scanned target device does not yield results that match the reference set, then the target device 100 is very probably not the expected device. The disclosure is not limited in this respect, however.

In an example, the specific characterization of a target device 100 according to its forced non-linear emissions 204 may enable reverse engineering of the target device 100. That is, the specific components, software, and even data of the target device 100 may be discerned through external examination with a FNLE system without requiring direct physical access to the integrated circuits involved. The FNLE system may identify "pin compatible" systems, component devices, and data that may not be identifiable without directly probing an IC die for example. The disclosure is not limited in this respect, however.

In an example, a FNLE system that receives information from a target device 100 indicative of its operating status may provide continuous or nearly continuous monitoring of operations of a target device 100 in situ via a comparison of the received forced non-linear emissions 204 to an acceptable baseline. This approach has the advantage that there is no need for physical (e.g., optical, electrical, or even radio) connection as intended by the target device's designers. The lack of connection means that the systems under test 100 are isolated from attack, such as a cyber-attack, but their operations may still be monitored via their forced non-linear emissions 204. This capability may be particularly useful for SUTs 100 that require high degrees of protection, are legacy systems without communications capabilities, or are systems that lack the capability to provide status information for example. When a system under test 100 behaves in an anomalous manner, the induced non-linear emissions 204 will generally change. The FNLE system may detect and classify such change.

The simplest classification is that the system under test 100 is either behaving normally or abnormally. In a more complex classification regime, the system under test 100 may be characterized as being in several predetermined conditions. For example, a target device 100 may be characterized as in a normal state, a restarting state, or in a state of exception processing. The FNLE system may examine the induced emissions 204 and determine if the target device 100 is running normally, is restarting, or is dealing with a fault. The FNLE system may identify the system under test 100 as being in a failed or unreliable state if the SUT 100 is in none of the pre-characterized states. The FNLE systems and methods described are thus means for gathering health and status information on target devices 100. The disclosure is not limited in this respect, however.

In an example, the forced non-linear emissions 204 may serve as intentional low data rate signals from a target device 100 in a particular operating regime. That is, a target device 100 may perform operations that are known to be identifiable to a FNLE system, to communicate particular status messages. The status messages may for example be simple heartbeat indicia or other predetermined indicia intended to convey predetermined meanings to a FNLE-based monitor that characterizes the emissions that it induces and receives. A FNLE system may also assemble a number of such status messages for example to provide a more complete data transmission system. This process is somewhat analogous to sending messages via Morse code. The target device 100 may send such messages surreptitiously. When the system under test 100 is placed in the operational state associated with each symbol for example of a message to be transmitted, the FNLE system may recognize the state and provide the appropriate output to convey the intended symbol and/or its associated meaning. The assembled message for example may comprise textual information on SUT 100 status, such as "Running Normally", "System Running Hot", "Power Low", etc. In a more complex example, the FNLE system may present the output of the FNLE-encoded data and pass it on for further processing. The disclosure is not limited in this respect, however.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the some embodiments can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second." and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. A software defined radio (SDR) system to remotely analyze avionics, the system comprising:
    transmitter circuitry configured to illuminate the avionics with intentional radio frequency (RF) energy to produce forced non-linear emissions that radiate from the avionics as an RF energy response;
    receiver circuitry configured to receive the RF energy response and generate a received RF energy representation;
    correlation and analysis circuitry to correlate the received RF energy representation with a baseline response representative of known good avionics and output an avionics status; and
    a baseline database coupled to the correlation and analysis circuitry, the baseline database comprising (a) a plurality of cockpit profiles and their respective, associated known good RF energy representations, (b) an avionics powered on or powered off state indication and a software version indication of avionics software stored with each associated known good RF energy representation, and (c) the baseline response.

2. The system of claim 1, wherein the correlation and analysis circuitry is further configured to compare the received RF energy representation to the plurality of baseline responses stored in the database in response to the received cockpit profile.

3. The system of claim 2, further comprising a controller configured to control the transmitter circuitry to transmit the intentional RF energy at a frequency, a range of frequencies, or a multi-tone emission in response to the received cockpit profile.

4. The system of claim 2, wherein the avionics are in a powered on state such that the intentional RF energy mixes with operational electromagnetic signals in the aircraft systems.

5. The system of claim 1, further comprising a controller coupled to the transmitter circuitry, the receiver circuitry and the correlation and analysis circuitry, the controller configured to receive a cockpit profile from an input device.

6. The system of claim 5, wherein the input device is a keypad, keyboard, or touchscreen display.

7. The system of claim 1, further comprising output circuitry coupled to the correlation and analysis circuitry to output the avionics status, the output circuitry comprising at least one of a display, a printer, or a voice response system.

8. A method for remotely determining avionics status, the method comprising:
    illuminating the avionics with intentional radio frequency (RF) energy from transmitter circuitry that outputs configured electromagnetic energy to produce forced non-linear emissions that radiate from the target device as an RF energy response;
    receiving the RF energy response using receiver circuitry;
    converting the RF energy response to a received RF energy representation;
    accessing a database storing (a) a plurality of baseline responses, (b) a plurality of cockpit profiles and their respective, associated known good RF energy representations, (c) an avionics powered on or powered off state indication and (d) a software version indication of avionics software stored with each associated known good RF energy representation;
    correlating the received RF energy representation with the plurality of baseline responses; and
    outputting the avionics status in response to the correlation of the received RF energy representation with the plurality of baseline responses.

9. The method of claim 8, further comprising determining a status of the software version of at least one of the aircraft systems.

10. The method of claim 8, further comprising generating a cockpit profile of the plurality of cockpit profiles of the aircraft systems in response to user inputs of aircraft avionics installed in the aircraft.

11. The method of claim 10, further comprising:
    generating the plurality of cockpit profiles, each with an associated RF energy representation; and
    storing the plurality of cockpit profiles and their respective, associated RF energy representations in the database.

12. A non-transitory computer-readable storage medium that stores instructions for execution by control circuitry of a software defined radio (SDR), the instructions cause the control circuitry to:
    illuminate avionics using transmitter circuitry that outputs intentional radio frequency (RF) energy to produce forced non-linear emissions that radiate from the avionics as an RF energy response;
    receive the RF energy response using receiver circuitry;
    convert the RF energy response to a received RF energy representation;
    access a database of baseline responses to correlate the received RF energy representation with the database of baseline responses, the database further includes (a) a plurality of cockpit profiles and their respective, associated known good RF energy representations, (b) an avionics powered on or powered off state indication and (c) a software version indication of avionics software stored with each associated known good RF energy representation; and determine a status of the avionics based on the correlation of the received RF energy representation and the database of baseline responses.

13. The non-transitory computer-readable storage medium of claim 12, wherein the instructions further cause the control circuitry to cause correlation and analysis circuitry to access the database over a wireless channel.

14. The non-transitory computer-readable storage medium of claim 13, wherein the instructions further cause the control circuitry to cause the correlation and analysis circuitry to output a status of the avionics over a wireless channel.

15. The non-transitory computer-readable storage medium of claim 13, wherein the instructions further cause the control circuitry to generate the database of baseline responses wherein each baseline response is associated with a different cockpit profile.

16. The non-transitory computer-readable storage medium of claim 13, wherein the instructions further cause the control circuitry to receive a cockpit profile representing the avionics.

* * * * *